United States Patent
Boutaba et al.

(10) Patent No.: US 11,438,139 B2
(45) Date of Patent: Sep. 6, 2022

(54) BLOCKCHAIN BASED SECURE NAMING AND UPDATE VERIFICATION

(71) Applicants: Raouf Boutaba, Waterloo (CA); Woojung Kim, Waterloo (CA); Yuhao Dong, Waterloo (CA)

(72) Inventors: Raouf Boutaba, Waterloo (CA); Woojung Kim, Waterloo (CA); Yuhao Dong, Waterloo (CA)

( * ) Notice: Subject to any disclaimer, the term of this patent is extended or adjusted under 35 U.S.C. 154(b) by 355 days.

(21) Appl. No.: 16/270,534

(22) Filed: Feb. 7, 2019

(65) Prior Publication Data

US 2019/0245680 A1    Aug. 8, 2019

Related U.S. Application Data

(60) Provisional application No. 62/627,736, filed on Feb. 7, 2018.

(51) Int. Cl.
| | |
|---|---|
| *H04L 9/06* | (2006.01) |
| *G06F 21/64* | (2013.01) |
| *G06F 21/57* | (2013.01) |
| *H04L 9/00* | (2022.01) |
| *G06F 8/65* | (2018.01) |

(52) U.S. Cl.
CPC .............. *H04L 9/0637* (2013.01); *G06F 8/65* (2013.01); *G06F 21/57* (2013.01); *G06F 21/64* (2013.01); *H04L 9/006* (2013.01); *H04L 9/0643* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 2017/0031676 A1* | 2/2017 | Cecchetti | H04L 9/3236 |
| 2018/0137306 A1* | 5/2018 | Brady | H04L 9/3236 |
| 2018/0176229 A1* | 6/2018 | Bathen | H04W 12/106 |
| 2018/0183606 A1* | 6/2018 | High | H04L 9/3239 |
| 2018/0262493 A1* | 9/2018 | Andrade | G06F 21/31 |
| 2018/0359096 A1* | 12/2018 | Ford | H04L 9/3236 |
| 2019/0080407 A1* | 3/2019 | Molinari | G06Q 20/223 |
| 2019/0141054 A1* | 5/2019 | Signorini | H04L 63/123 |

(Continued)

OTHER PUBLICATIONS

Ali, Muneeb et al., "Blockstack: AGlobal Naming and Storage System Secured by Blockchains", 2016 USENIX Annual Technical Conference (USENIX ATC '16), Jun. 22-24, 2016 • Denver, CO, USA, pp. 181-194 (15 total pages). (Year: 2016).*

*Primary Examiner* — Michael Pyzocha
(74) *Attorney, Agent, or Firm* — Brill Law Office; Jeffrey Brill

(57) ABSTRACT

A secure update is provided from a server to an end-point device. The server registers digital information, such as a name or a software package, and a verifiable key, such as a cryptographic hash, derived from the digital information. A publicly accessible transaction log stores the verifiable key in a block and provides an identifier of the block to the server. An end-point device receives the digital information and the identifier, and computes a separate verifiable key. The end-point device retrieves the verifiable key from the block of the publicly accessible transaction log, and compares the retrieved verifiable key to the separate verifiable key to determine whether the digital information has been compromised.

19 Claims, 7 Drawing Sheets

(56) References Cited

U.S. PATENT DOCUMENTS

| | | | |
|---|---|---|---|
| 2019/0163912 A1* | 5/2019 | Kumar | H04L 9/3247 |
| 2019/0251648 A1* | 8/2019 | Liu | G06Q 50/184 |
| 2019/0340379 A1* | 11/2019 | Beecham | G06F 16/9014 |
| 2020/0233950 A1* | 7/2020 | Assenmacher | G06F 21/44 |
| 2020/0295941 A1* | 9/2020 | Daniel | H04L 63/123 |

\* cited by examiner

US 11,438,139 B2

BLOCKCHAIN BASED SECURE NAMING AND UPDATE VERIFICATION

CROSS-REFERENCE TO RELATED APPLICATIONS

The present application claims the benefit under 35 U.S.C. § 119(e) of U.S. Provisional Patent Application Ser. No. 62/627,736, entitled "Efficient Blockchain PKI with Centralized Administration," filed on Feb. 7, 2018, the entire contents of which are incorporated herein by reference.

TECHNICAL FIELD

The present disclosure relates to providing secure updates from an update server that can be verified by a client device using a publicly accessible transaction log, such as a distributed ledger or blockchain.

BACKGROUND

Software update systems can be used to deliver revisions to an end-user. These revisions may include adding a new feature, removing outdated components, providing bug fixes, or fixing security vulnerabilities that have been discovered. Traditional software update systems use a centralized system that all end-users receive the latest updates from on a push or pull basis. The end-users have to blindly trust that the centralized system has not been compromised and that the updates are correct and legitimate.

These centralized systems provide an appealing target to malicious actors, because if the centralized system can be compromised, then malicious code can be added to the software updates and distributed to end-users. Thus all of the end-users that are accessing updates from the centralized system can be infected with malware via compromised updates. Because the end-users have no way of verifying whether the centralized system has been compromised, the end-users will typically install the compromised updates if the updates that are being installed have been compromised.

SUMMARY

The technology described herein provides a system and method for providing a secure update by introducing a partially trusted intermediary, such as an update server, that allows the update server to write digital information, such as verifiable keys, received from separate devices to a publicly accessible transaction log, such as a blockchain, and enables an end-point device to verify the digital information using the verifiable keys retrieved from the publicly accessible transaction log. By verifying the digital information using the publicly accessible transaction log, an end-point device can determine whether the digital information and/or the update server has been compromised.

One general aspect of the subject matter in this disclosure is a method of providing a secure update from a server to an end-point device including: registering, by a server, digital information and a verifiable key derived from the digital information; transmitting, by the server, the verifiable key derived from the digital information to a publicly accessible transaction log, where the publicly accessible transaction log separately stores the verifiable key derived from the digital information in a block of the publicly accessible transaction log, where the block has an identifier; adding, by the server, the identifier of the block to the registration of the digital information and the verifiable key derived from the digital information; and providing, by the server, the digital information and the identifier of the block to an end-point device, where the end-point device uses the identifier of the block to retrieve the separately stored verifiable key derived from the digital information from the publicly accessible transaction log, and where the end-point device independently computes a separate verifiable key from the provided digital information, and where the end-point device determines whether the provided digital information has been compromised, by comparing the verifiable key derived from the digital information retrieved from the publicly accessible transaction log to the independently computed separate verifiable key from the retrieved digital information.

Implementations may include one or more of the following features. The method where the end-point device is an internet of things (IoT) device. The method where the IoT device is one from a group including of: a smart thermostat, a smart vehicle, a smart speaker, a smart appliance, a smart security system, a wearable device, a smart camera, a smart entertainment system, a smart lock, and a smart lighting device. The method where the publicly accessible transaction log is a blockchain. The method where the blockchain is Bitcoin. The method where the blockchain is Ethereum. The method where the identifier of the block is a height of the block in the publicly accessible transaction log, the height of the block being relative to a reference block in the publicly accessible transaction log. The method where: the digital information further includes a software update. The method further including: receiving the digital information from a remote computing device and where the digital information includes a registered public key. The method where the verifiable key derived from the digital information includes a hash of the digital information, where the hash of the digital information is received by the server from a remote computing device. The method where the verifiable key derived from the digital information includes a cryptographic hash of the digital information, where the hash of the digital information is computed by the server. The method where the end-point device determines that the provided digital information has been compromised, responsive to the verifiable key derived from the digital information retrieved from the publicly accessible transaction log not matching the independently computed separate verifiable key from the retrieved digital information, and where the end-point device takes a security action in response to the determination that the digital information has been compromised. The method where the end-point device determines that the provided digital information has not been compromised, responsive to the verifiable key derived from the digital information retrieved from the publicly accessible transaction log matching the independently computed separate verifiable key from the retrieved digital information, and where the end-point device utilizes the digital information in response to the determination that the digital information has not been compromised. The method where the provided digital information includes a software update for the end-point device and where utilizing the digital information includes installing the software update on the end-point device. The method further including: receiving a signature associated with the digital information, the signature being verifiable with a registered public key associated with the digital information; determining from the digital information, a permissions threshold associated with the digital information, the permissions threshold representing a quantity of signatures; and determining that the received signature satisfies the permissions threshold. The method where registering, by the server, the digital information and the verifiable key derived from the digital information further includes: inserting a first specific node in an index tree containing the digital information and the verifiable key derived from the digital information. The method further including: registering, by the server, subsequent digital information corresponding to the digital information contained in the first specific node by inserting a second specific node in the index tree containing the subsequent digital information and a subsequent verifiable key derived from the subsequent digital information; and referencing the second specific node by an update reference of the first specific node in an update chain. The method further including: registering, by the server, subsequent digital information unrelated to the digital information contained in the first specific node by inserting a second specific node in the index tree containing the subsequent digital information and a subsequent verifiable key derived from the subsequent digital information; and referencing the second specific node by a child reference of the first specific node in the index tree. The method where the index tree is a binary search tree. One general aspect includes a method of providing a secure update to an end-point device including: receiving, by the end-point device, digital information and identifier of a block in a publicly accessible transaction log; computing a verifiable key from the received digital information; using the identifier of the block in the publicly accessible transaction log to retrieve a separate verifiable key from the block of the publicly accessible transaction log; comparing the computed verifiable key to the retrieved separate verifiable key; and determining whether the received digital information has been included based on the comparison.

One general aspect includes a method of providing a secure update to an end-point device including: receiving, by the end-point device, digital information, a registered public key, an identifier of a block in a publicly accessible transaction log, and a transaction identifier associated with the block in the publicly accessible transaction log; computing a verifiable key from the received digital information and the registered public key; using the identifier of the block and the transaction identifier in the publicly accessible transaction log to retrieve a separate verifiable key from the block of the publicly accessible transaction log; comparing the computed verifiable key to the retrieved separate verifiable key; and determining whether the received digital information has been included based on the comparison.

Implementations may include one or more of the following features. The method where the end-point device is an internet of things (IoT) device. The method where the publicly accessible transaction log is a blockchain. The method where the blockchain is one of Bitcoin and Ethereum. The method where the identifier of the block is a height of the block in the publicly accessible transaction log, the height of the block being relative to a reference block in the publicly accessible transaction log. The method where: the digital information further includes a software update. The method where the verifiable key derived from the digital information includes a hash of the digital information. The method further including: determining, by the end-point device, that the provided digital information has been compromised, responsive to the computed verifiable key not matching the retrieved separate verifiable key; and taking a security action, by the end-point device, in response to the determination that the digital information has been compromised. The method further including: determining, by the end-point device, that the provided digital information has not been compromised, responsive to the computed verifiable key matching the retrieved separate verifiable key; and utilizing the digital information, by the end-point device, in response to the determination that the digital information has not been compromised.

One general aspect includes a method of providing a secure update from a server to an end-point device including: receiving, by a server, a software package from a remote computing device; encoding the software package as a transaction in a first node of an index tree, the first node of the index tree spending an unspent transaction output from a previous node of the index tree; broadcasting the transaction to a publicly accessible blockchain, where the publicly accessible blockchain separately stores the transaction in a block identified by a height in the publicly accessible block chain; receiving at the server, the height identifying the block in the publicly accessible blockchain; updating the transaction stored in the first node of the index tree to include the height identifying the block in the publicly accessible blockchain; and providing the transaction to an end-point device, where the end-point device uses the height identifying the block in the publicly accessible blockchain to retrieve the separately stored transaction, and where the end-point device derives a hash of the software package included within the provided transaction, and where the Fend-point device determines whether the software package has been compromised by comparing the hash derived from the software package to a separate hash included as part of the separately stored transaction retrieved from the publicly accessible blockchain.

Implementations may include one or more of the following features. method where the end-point device determines that the software package has not been compromised, responsive to the hash derived from the software package matching the separate hash included as part of the separately stored transaction retrieved from the publicly accessible blockchain, and where the end-point device installs the software package in response to the determination that the software package has not been compromised.

One general aspect includes a method of providing a secure naming system, the method including: receiving, by a namespace administrator, a name registration; registering a name-binding associated with the name registration in a node of an index tree, the name-binding including an index and a hash of the name registration and where the node spends an unspent transaction from a previous node in the index tree, where the unspent transaction is from a publicly accessible transaction log; computing a verifiable random function of the name registration, the verifiable random function using a private key to compute and where the verifiable random function can be publicly verified; determining a proof of existence of the name-binding in the node of the index tree, the proof of existence represented as a path of transaction from a root node to the node of the index tree; receiving a query of the name registration from an end-point device; and providing the verifiable random function, the proof of existence, and the name-binding to the end-point device and where the end-point device derives the index of the node of the index tree using the verifiable random function, verify the proof of existence, and determine whether the name-binding hashes to a value matching in the proof of existence.

The above described general aspects and implementations can also be in the form of one or more servers and/or computer readable media.

Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The technology described herein provides a system and method for providing a secure naming and/or secure updates by introducing a partially trusted intermediary, such as an update server 104, that allows devices to write digital information, such as software updates or names, to a publicly accessible transaction log 108 and enables an end-point device 106 to verify the digital information using the publicly accessible transaction log 108. By verifying the digital information using the publicly accessible transaction log 108, an end-point device 106 can determine whether the digital information and/or the update server 104 has been compromised.

Figure 1:
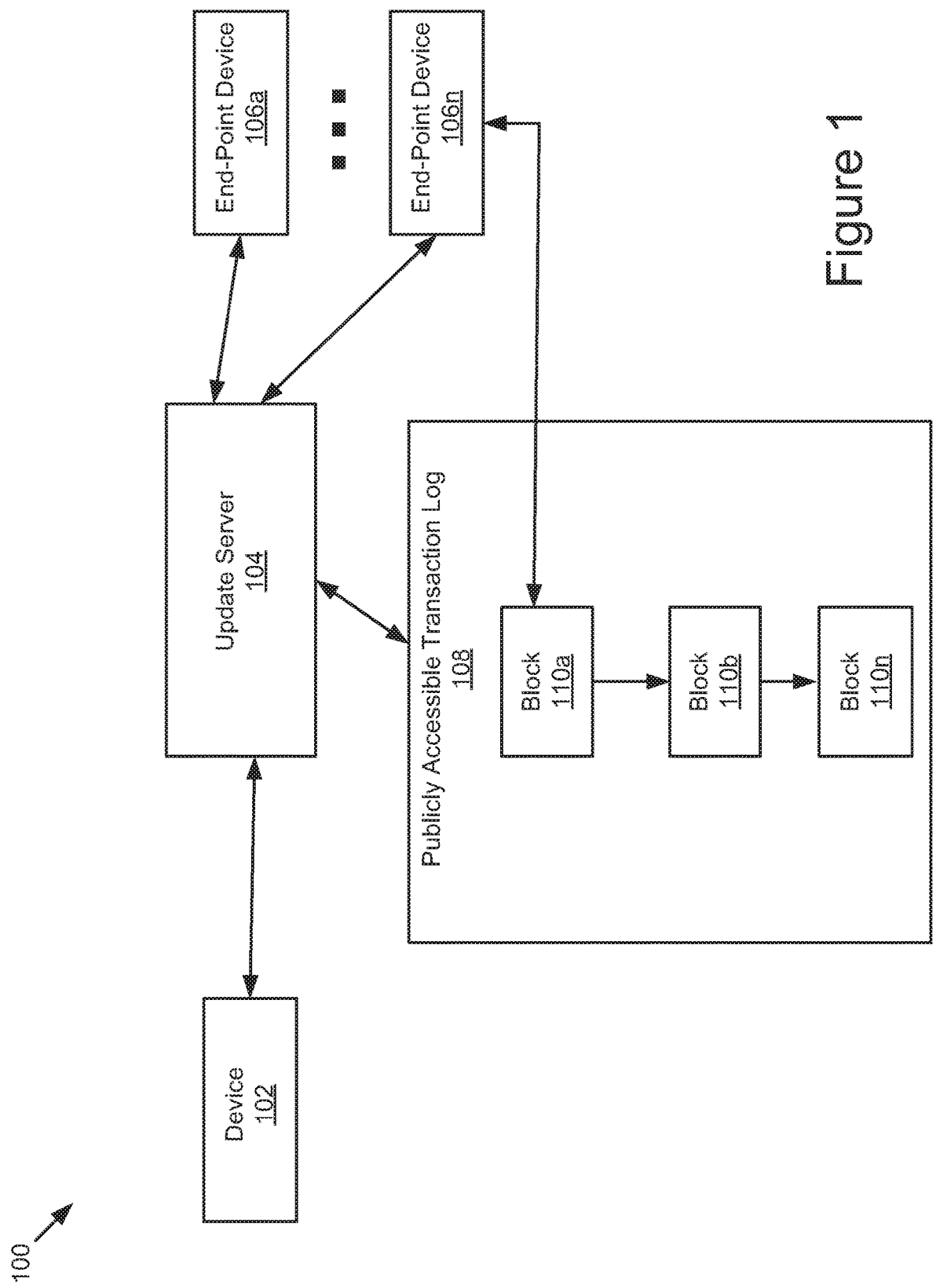
FIG. 1 is a block diagram illustrating an example system for providing secure updates.

FIG. 1 is a block diagram 100 illustrating an example system for providing a secure update. The illustrated system 100 includes a device 102, an update server 104, an end-point device 106, and a publicly accessible transaction log 108, which are communicatively coupled via a network for interaction with one another. The use of the nomenclature "Xn" in the reference numbers indicate a variable number of those elements having that reference number may be included in the system 100.

The network may include one or more networks and/or network types. For example, the network may include, but is not limited to, one or more wide area networks (WANs) (e.g., the Internet), local area networks (LANs), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc.

The device 102 may be a computing device having data processing and communication capabilities. For instance, a device 102 may include a processor (e.g., virtual, physical, etc.), a memory, a power source, a network interface, and/or other software and/or hardware components, display, graphics processor, wireless transceivers, keyboard, camera, sensors, firmware, operating systems, drivers, various physical connection interfaces (e.g., USB, HDMI, etc.). The device 102 may couple to and communicate with other entities of the system 100 via the network using a wireless and/or wired connection. In some implementations, the system 100 may include multiple devices 102. In addition, the device 102 may be instantiated using the same or different types of computing devices. In some implementations, the device 102 is in the form of a computer system used by a developer of software and the device 102 is used to transmit software updates to the update server 104, as described in more detail below. Example devices 102 may include, but are not limited to, desktops, laptops, tablets, netbooks, smart TVs, set-top boxes, personal digital assistants, wearable devices, etc.

The update server 104 may be in the form of one or more computing devices and applications having data processing, storing, and communication capabilities. For example, the update server 104 may comprise one or more hardware servers, server arrays, storage devices and/or systems, etc., and/or may be centralized or distributed/cloud-based. In some implementations, the update server 104 may include one or more virtual servers, which operate in a host server environment and access the physical hardware of the host via an abstraction layer (e.g., a hypervisor or virtual machine manager).

The update server 104 may include software applications that run one or more computer processors of the update server 104 to provide various computing functionalities, services, and/or resources, and to transmit data to and receive data from the device 102, the end-point device 106, and/or the publicly accessible transaction log 108. For example, the software applications may provide functionality for receiving digital information, such as a software package from the device 102 and may provide the digital information to the end-point device 106. It should be understood that the update server 104 is not limited to providing the above-noted services and may include other network-accessible services described in more detail with respect to FIG. 2.

The end-point device 106, may be in the form of any type of computing device. For instance, the end-point device 106 may include a processor (e.g., virtual, physical, etc.), a memory, a power source, a network interface, and/or other software and/or hardware components. The end-point device 106 may couple to and communicate with other entities of the system 100 via the network using a wireless and/or wired connection. Although FIG. 1 only illustrates two end-point devices 106, in some implementations, the system 100 may include many more (e.g., orders of magnitude more) end-point devices 106. In addition, the end-point device 106 may be instantiated using the same or different types of computing devices. In some implementations, some or all end-point devices 106 may be in the form of a thin-client device with constraints such as limited bandwidth, processing power, and/or memory resources. Examples of such thin-client devices may include Internet of Things ("IOT") devices such as a smart thermostat, a smart vehicle, a smart speaker, a smart appliance, a smart security system, a wearable device, a smart camera, a smart entertainment system, a smart lock, a smart lighting device, or any other internet connected device that can receive and provide information to other devices over a network. In some implementations, the update server 104 may be configured to provide the thin-client device 106 with digital information, such as a software update for the thin-client device to update software thereon.

The publicly accessible transaction log 108 may be communicatively coupled with other entities of the system 100 via the network using a wireless and/or wired connection. In some implementations, the publicly accessible transaction log 108 may be distributed ledger, such as a blockchain representing a list of records, which are referred to as blocks 110 that are linked and secured using cryptography. In some implementations, blocks 110 of the blockchain may store a cryptographic hash of a previous block 110, making the blockchain resilient to modification, since changing information in the block 110 consequently requires modifying all subsequent blocks. The nature of this linking of the blocks 110 provides a high level of security, especially if there are a large number of blocks 110. Example blockchains that may be used in different implementations include, Bitcoin, Ethereum, Ripple Consensus Network, Hyperledger, Corda, Symbiont Distributed Ledger, IBM Blockchain, Multichain, HydraChain, BigChainDB, OpenChain, Chain Core, Quorum, IOTA, or any other appropriate publicly accessible distributed ledger.

In some implementations, the publicly accessible transaction log 108 uses a consensus algorithm that allows participants of the publicly accessible transaction log 108 to agree on information included within a block 110 each time new records are added. Using the consensus algorithm, the publicly accessible transaction log 108 can replicate blocks 110 and maintain the same state across the network of participants, allowing the publicly accessible transaction log 108 to function as a secure, decentralized, append-only ledger. Examples of consensus algorithms that can be used in this capacity include a proof-of-work, proof-of-stake, proof-of-activity, proof-of-burn, proof-of-capacity, or proof-of-elapsed time.

Figure 2:
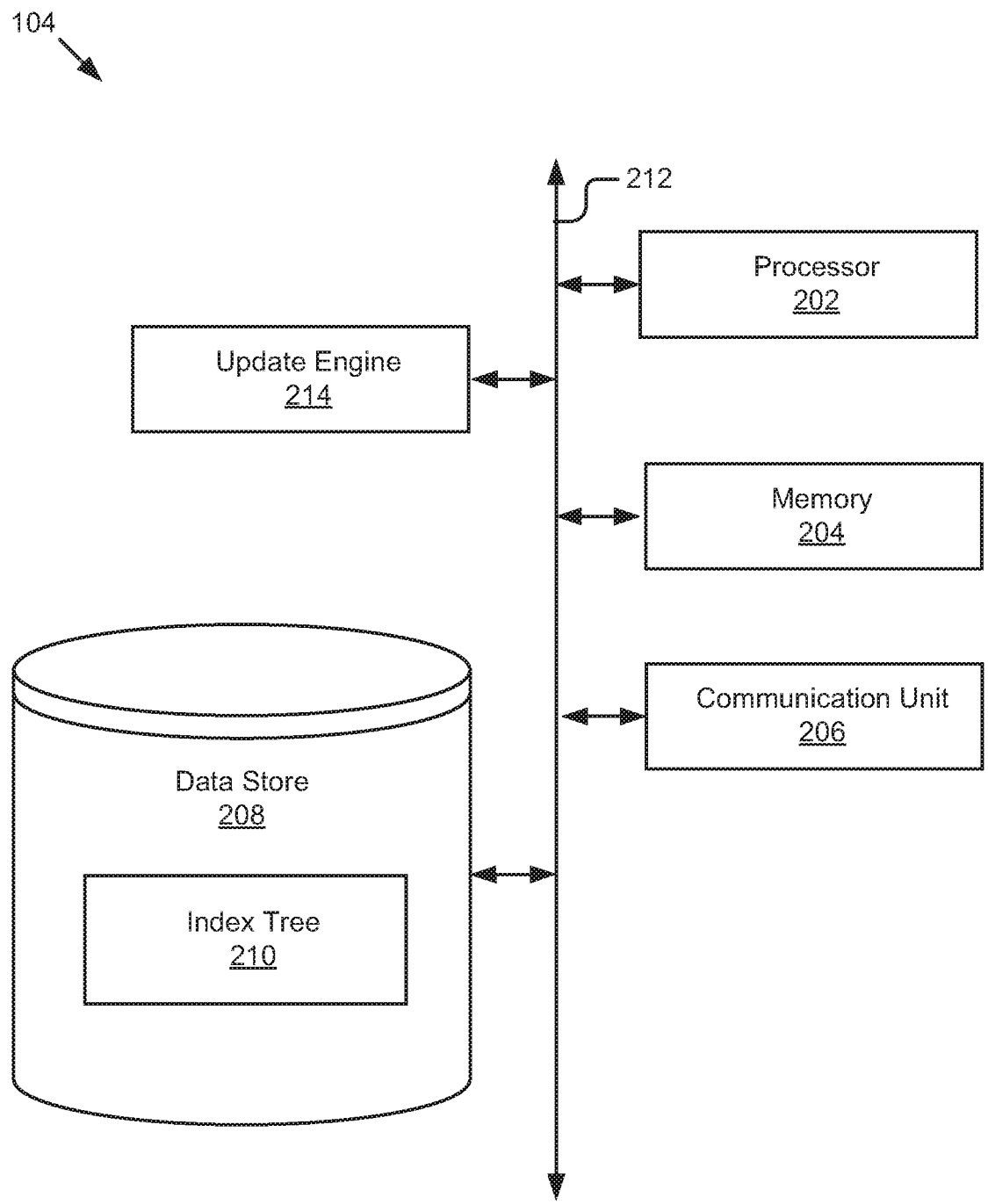
FIG. 2 is a block diagram illustrating an example update server.

FIG. 2 is a block diagram of an example update server 104. As depicted, the update server 104 may include processor 202, memory 204, communication unit 206, update engine 214, and data store 208, which are communicatively coupled by a communications bus 212. However, it should be understood that the update server 104 is not limited to such, and may include more, fewer, and/or different elements, including, for example, those discussed with reference to the update server 104 in FIG. 1.

The processor 202 may execute software instructions by performing various input/output, logical, and/or mathematical operations. The processor 202 has various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores.

The memory 204 is a non-transitory computer-readable medium that is configured to store and provide access to data to the other elements of the update server 104. In some implementations, the memory 204 may store instructions and/or data that may be executed by the processor 202. For example, the memory 204 may store the data store 208 and/or the index tree 210. The memory 204 is also capable of storing other instructions and data, including, for example, an operating system, hardware drivers, other software applications, data, etc. The memory 204 may be coupled to the bus 212 for communication with the processor 202 and the other elements of the update server 104. Memory 204 can be in the form of RAM, ROM, flash memory and/or other forms of computer accessible media.

The communication unit 206 may include one or more interface devices (I/F) for wired and/or wireless connectivity with the network and/or other devices, such as those depicted in FIG. 1. In some implementations, the communication unit 206 may include ports for wired connectivity with other devices. For example, the communication unit 206 may include a CAT-5 interface, Thunderbolt™ interface, FireWire™ interface, USB interface, etc. In some implementations, the communication unit 206 may be configured to receive control signals for communicating information between the device 102, the publicly accessible transaction log 108, and/or the end-point device 106. In some implementations, the communication unit 206 may include transceivers for sending and receiving wireless signals. For instance, the communication unit 206 may include radio transceivers for communication with the network and for communication with nearby devices using close-proximity (e.g., Bluetooth®, NFC, etc.) connectivity.

The update engine 214 may include software and/or logic for encoding verifiable keys in a publicly accessible transaction log 108 and maintaining an index tree 210 for future access of the information in the publicly accessible transaction log 108. The update engine 214 may be coupled to the communication unit 206 to send and receive control signals related to the digital information to the other elements of FIG. 1. For example, in one implementation, the update engine 214 may receive control signals from the communication unit 206 indicating that an end-point device 106 is requesting to verify digital information related to an update, and the update engine 214 may process those control signals and identify a related node in the index tree 210 that includes the requested information, and then send separate control signals to the end-point device 106 via the communication unit 206 for the end-point device 106 to verify the digital information.

The data store 208 can be a combination of software and/or hardware for storing, structuring, and providing access to data. In some implementations, the data store 208 may include an index tree 210 that is maintained by the update server 104. For example, a database or other storage mechanism can be used to store, organize, and/or access information associated with digital information, cryptographic hashes, verifiable keys, software packages, identifications of blocks, heights of blocks, locations of software updates, identity scripts, signatures, etc., and/or any other information generated, stored, and/or retrieved by the update server 104.

The underlying storage hardware can be in the form of electro-mechanical disks, solid state disks, RAM, other forms of computer accessible memory, etc. In some implementations, the data store 208 may be or instantiated in conjunction with a distributed data store, such as a cloud-based computing and/or data storage system. In some implementations, the data store 208 may include a database management system (DBMS). For example, the DBMS could be a structured query language (SQL) DBMS. For instance, data store 208 may store data in an object-based data store or multi-dimensional tables comprised of rows and columns, and may manipulate, i.e., insert, query, update, and/or delete, data entries stored in the verification data store using programmatic operations (e.g., SQL queries and statements or a similar database manipulation library). Additional characteristics, structure, acts, and functionality of the data store 208 is discussed elsewhere herein.

In some implementations, the update engine 214 maintains an index tree 210 stored in the data store 208 or other storage medium accessible by the update engine 214. In some implementations, the index tree may represent a data structure for storing and accessing information. In some implementations, the index tree 210 may store transactions representing digital information within nodes of the index tree.

In some implementations, the index tree 210 may function as a binary search tree and digital information may be stored in nodes of the binary search tree based on a comparison of hashes of the transactions. In some implementations, the binary search tree may be a rooted binary tree whose internal nodes each store information, and each have up to two sub-trees denoted as left nodes and right nodes. When additional nodes are inserted into the binary search tree, the new nodes may be inserted based on a comparison of the information of the new node being less than or greater than the information in an internal node and moving through the sub-trees based on that comparison. The binary search tree may allow for insertion of new nodes, traversal of the nodes, retrieval of information of specific nodes, verification of information in the nodes, and searching of information within the nodes of the binary search tree.

In some implementations, the binary search tree may enable fast lookup of individual nodes by storing digital information in the nodes of the binary search tree, and enabling lookup of specific digital information by traversing left or right through each of the sub-trees of nodes based on a comparison between the information for lookup and the digital information stored in each node. Since the sub-trees each split to the left or right, in a balanced binary search tree, each comparison allows the lookup operation to skip about half of the binary search tree as it continues the look-up through the sub-trees. The index tree is described in greater detail with respect to FIG. 4.

As noted above, the functionalities of the update server 104, device 102, and end-point device 106 can be implemented on other computing devices, or can be distributed between multiple computer systems, including within a cloud-based computing environment in which the functionality of the system 100 is provided as a service over a network. It is to be understood that although the update server 104, device 102, and end-point device 106 are illustrated in FIG. 1 as standalone entities, each component of the system 100 represents a collection of functionalities, which can be instantiated as a single or as multiple modules on one or more of the update server 104, device 102, and/or end-point device 106 as desired. FIG. 2 illustrates a specific embodiment of update server 104 instantiated in the form of specific, multiple modules which are located on update server 104. In other embodiments, the functionalities of the system 100 are distributed and/or instantiated in other ways.

The modules of the system 100, device 102, end-point device 106, and/or update server 104 can be instantiated (for example as object code or executable images) within the memory (e.g., RAM, ROM, flash memory) of any of the components, such that when the processor 202 processes a module, the update server 104 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the system 100 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Figure 3:
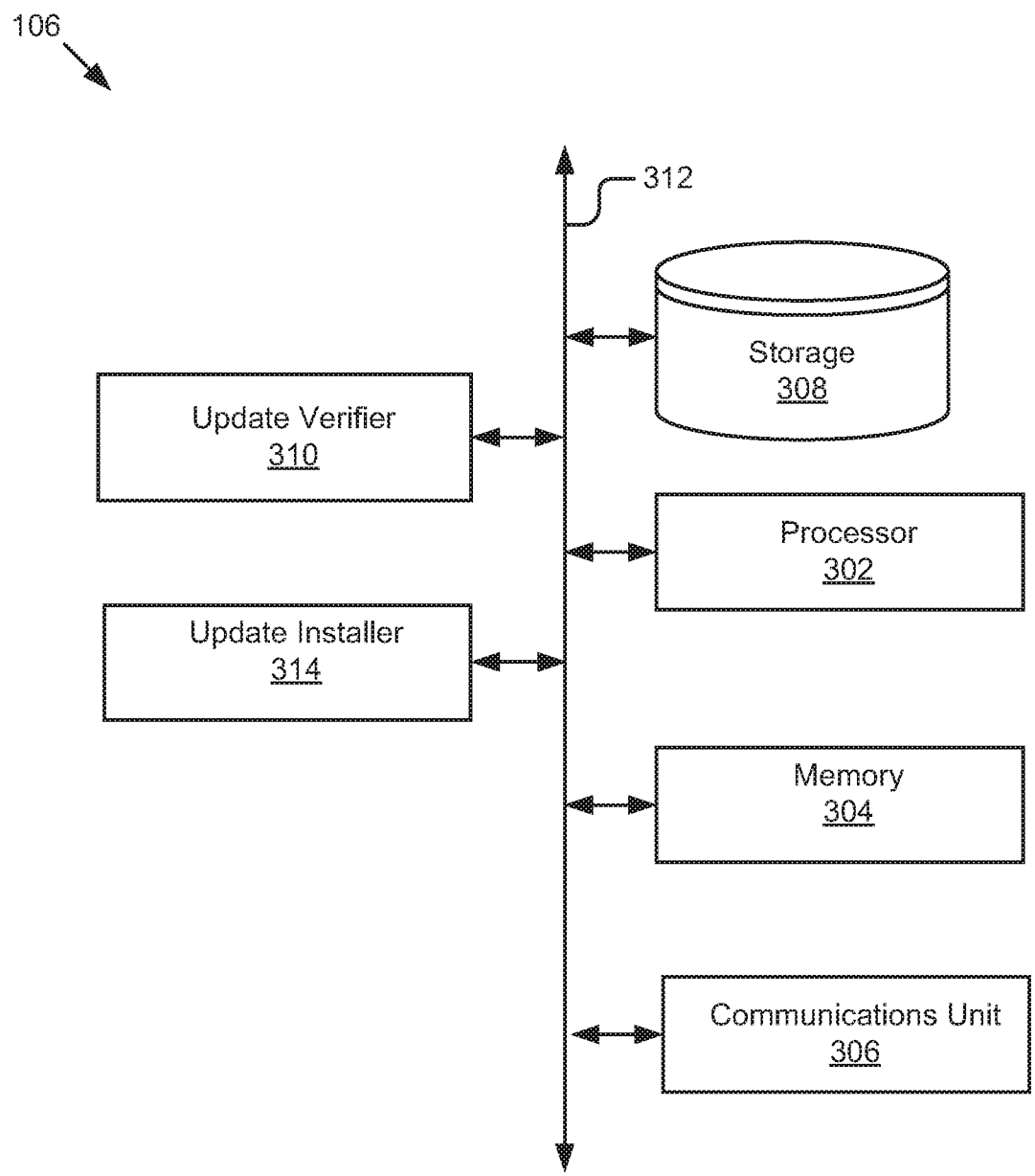
FIG. 3 is a block diagram illustrating an example end-point device.

FIG. 3 is a block diagram of an example end-point device 106. As depicted, the end-point device 106 may include processor 302, memory 304, communication unit 306, update verifier 310, update installer 314, and storage 308, which are communicatively coupled by a communications bus 312. However, it should be understood that the end-point device 106 is not limited to such, and may include more, fewer, and/or different elements, including, for example, those discussed with reference to the update server 104 in FIG. 2.

The processor 302 may execute software instructions by performing various input/output, logical, and/or mathematical operations. The processor 302 has various computing architectures to process data signals including, for example, a complex instruction set computer (CISC) architecture, a reduced instruction set computer (RISC) architecture, and/or an architecture implementing a combination of instruction sets. The processor 302 may be physical and/or virtual, and may include a single core or plurality of processing units and/or cores. In some implementations, the end-point device 106 may be a thin-client device with less processing capability.

The memory 304 is a non-transitory computer-readable medium that is configured to store and provide access to data to the other elements of the end-point device 106. In some implementations, the memory 304 may store instructions and/or data that may be executed by the processor 302. The memory 304 is also capable of storing other instructions and data, including, for example, an operating system, hardware drivers, other software applications, data, etc. The memory 304 may be coupled to the bus 312 for communication with the processor 302 and the other elements of the end-point device 106. The memory 304 can be in the form of RAM, ROM, flash memory, and/or other forms of computer accessible media.

The communication unit 306 may include one or more interface devices (I/F) for wired and/or wireless connectivity with the network and/or other devices, such as those depicted in FIG. 1. In some implementations, the communication unit 306 may include transceivers for sending and receiving wireless signals. For instance, the communication unit 306 may include radio transceivers for communication with the network and for communication with nearby devices using close-proximity (e.g., Bluetooth®, NFC, etc.) connectivity. In some implementations, the communication unit 306 may include ports for wired connectivity with other devices. For example, the communication unit 206 may include a CAT-5 interface, Thunderbolt™ interface, FireWire™ interface, USB interface, etc. In some implementations, the communication unit 206 may be configured to receive control signals for communicating information between the device 102, the publicly accessible transaction log 108, and/or the update server 104.

The update verifier 310 may include software and/or logic for verifying a verifiable key by determining a separate verifiable key and comparing that to a verifiable key stored in the publicly accessible transaction log 108. The update verifier 310 may be coupled to the communication unit 306 to transmit and receive control signals related to the digital information to the other elements of FIG. 1. For example, in one implementation, the update verifier 310 may receive control signals from the communication unit 306 indicating that an update server 104 is providing digital information that the end-point device 106 may verify.

The update installer 314 may include software and/or logic for utilizing the digital information, such as by installing a software update for an application on the end-point device 106 based on the determination from the update verifier 310. The update installer 314 may be coupled to the communication unit 306 to send and receive control signals related to the digital information to the other elements of FIG. 1. For example, in one implementation, the update installer 314 may receive control signals from the communication unit 306 indicating that the update verifier 310 has determined that the digital information has been compromised. The update installer 314 can use the information to perform a security action on the software package, such as to halt installation of the software package, alert other components of the system 100, etc.

The storage 308 can be a combination of software and/or hardware for storing, structuring, and providing access to data. For example, a database or other storage mechanism can be used to store, organize, and/or access information associated with digital information, cryptographic hashes, verifiable keys, software packages, identifications of blocks, heights of blocks, locations of software updates, identity scripts, signatures, operation logs, transactions, etc., and/or any other information generated, stored, and/or retrieved by the update server 104. In some implementations, the end-point device 106 may be a thin-client device with limited storage and the update server 104 may be able to provide digital information that can be verified without exceeding the limited storage on the thin-client device.

The underlying storage hardware can be in the form of electro-mechanical disks, solid state disks, RAM, other forms of computer accessible memory, etc. In some implementations, the storage 308 may be or instantiated in conjunction with a distributed data store, such as a cloud-based computing and/or data storage system. In some implementations, the storage 308 may include a database management system (DBMS). For example, the DBMS could be a structured query language (SQL) DBMS. For instance, storage 308 may store data in an object-based data store or multi-dimensional tables comprised of rows and columns, and may manipulate, i.e., insert, query, update, and/or delete, data entries stored in the verification data store using programmatic operations (e.g., SQL queries and statements or a similar database manipulation library). Additional characteristics, structure, acts, and functionality of the data store 208 is discussed elsewhere herein.

In some implementations, the digital information may include a hash of the software package. The end-point device 106 verifies the validity of the software package by computing and comparing the hash of the software package obtained from the server or any other data store. The end-point device 106 verifies the authenticity of the software package using the registered public keys. In some implementations, the registered public keys may be included in digital information provided by the device 102 to the update server 104, while in further implementations, the registered public keys may be separately provided for the end-point device 106 to verify the digital information.

In some implementations, the digital information may concern a software package from a developer, which has been provided to the update server 104 via the device 102. The developer may register the software package in the update server 104 by submitting a software registration that is received by the update server 104. In some implementations, the registration may include a JSON object containing a software name, a secure hash of the software package, and/or an identity script including a set of public keys. The update engine 214 may register the software package by appending a new tree node 404 into the index tree 210 that represents the software as described in detail with respect to FIG. 4. In some implementations, the registration may include:

Name: a string representing the name of the software package corresponding to this revision. In some implementations, the name string is unique.

Version: a numerical value for the update version which is higher than the version presented in registration of the software package or a previous revision of the software package.

Data: a base-16 encoded string where the first 4-byte is version and the remainder is a hash of the software package binary.

Signature: an identity script which defines a permissions threshold of required signatures that are provided in future revisions in order to be added to the registration.

In some implementations, the identity script may be a simple stack-based script that defines a permissions threshold, such as a quorum of signatures, and the identity script represents which signatures are needed to authorize future updates of the identity script. If a revision is provided that includes the appropriate signatures to meet the permissions threshold, then the update server 104 may store the revision. If the permissions threshold is not met, then the revision is not authorized. In further implementations, the end-point device 106 may separately determine if a permissions threshold has been met using the provided signatures and the identity script. The update engine 214 may check for the appropriate signatures, such as signatures represented or produced using private keys and/or verifiable using private keys, when a software package is received. In some implementations, the identity script may be updated in subsequent revisions of the software package, and a different permissions threshold may be set based on the new permissions threshold indicating how many signatures are required.

In some implementations, the identity script may include different levels of permissions, such as a first level that requires two of a group of three developers' signatures, and a second level that also requires a manager's signature. Other implementations of identity scripts with alternative levels of permissions are also contemplated. By having an identity script with a permissions threshold, developers are assured that only someone with the required permissions (e.g., that submits the correct signatures) can add revisions to the registration.

In some implementations, after a software package has been registered, a developer may provide a revision to a software registration that was previously stored in the index tree 210. In some implementations, the revision may be a JSON object containing formatted information describing a software update with cryptographic proofs authenticating the validity of the revision. In some implementations, a revision may be similar to a registration of a software package. In some implementations, the revision may include:

Name: a string representing the name of the software package corresponding to this revision.

Version: a numerical value for the version which is higher than the version presented in registration or a previous revision.

Data: a base-16 encoded string where the first 4-byte is version and the remainder is a hash of the software update binary.

Signature: a list of signatures obtained by signing data, verifiable by registered public keys.

In some implementations, the registration and/or the revision points to an update binary that represents the actual software update for the end-point device 106, rather than providing the actual software update in the update server 104. A developer can add in a URL in each registration and/or revision to indicate where an end-point device 106 can obtain the update binary and the information of where the update binary can be obtained is provided to the end-point device 106 along with the information to verify the update as described elsewhere herein. In this implementations, the update server 104 avoids embedding the update binary in the publicly accessible transaction log 108 (such as a blockchain) since the information in the publicly accessible transaction log 108 does not change while a location of the update binary can be changed.

As described in FIG. 2, the update engine 214 of the update server 104 can manage registrations provided by a developer as described above. In one example implementation, the update server 104 can perform the following functions described in greater detail with respect to FIGS. 4 and 5:

Create a registration.
Add a revision to the registration.
Encode hashes of registrations and revisions in blockchain transactions of the publicly accessible transaction log 108.
Broadcast transactions.
Listen for confirmation to obtain transaction identifications ("TXID") and block identifiers (such as a block height) in order to locate the TXIDs.
Create operations by combining the digital information provided by a developer, the TXID, and the block identifiers.
Provide the operations to the end-point device 106.

Figure 4:
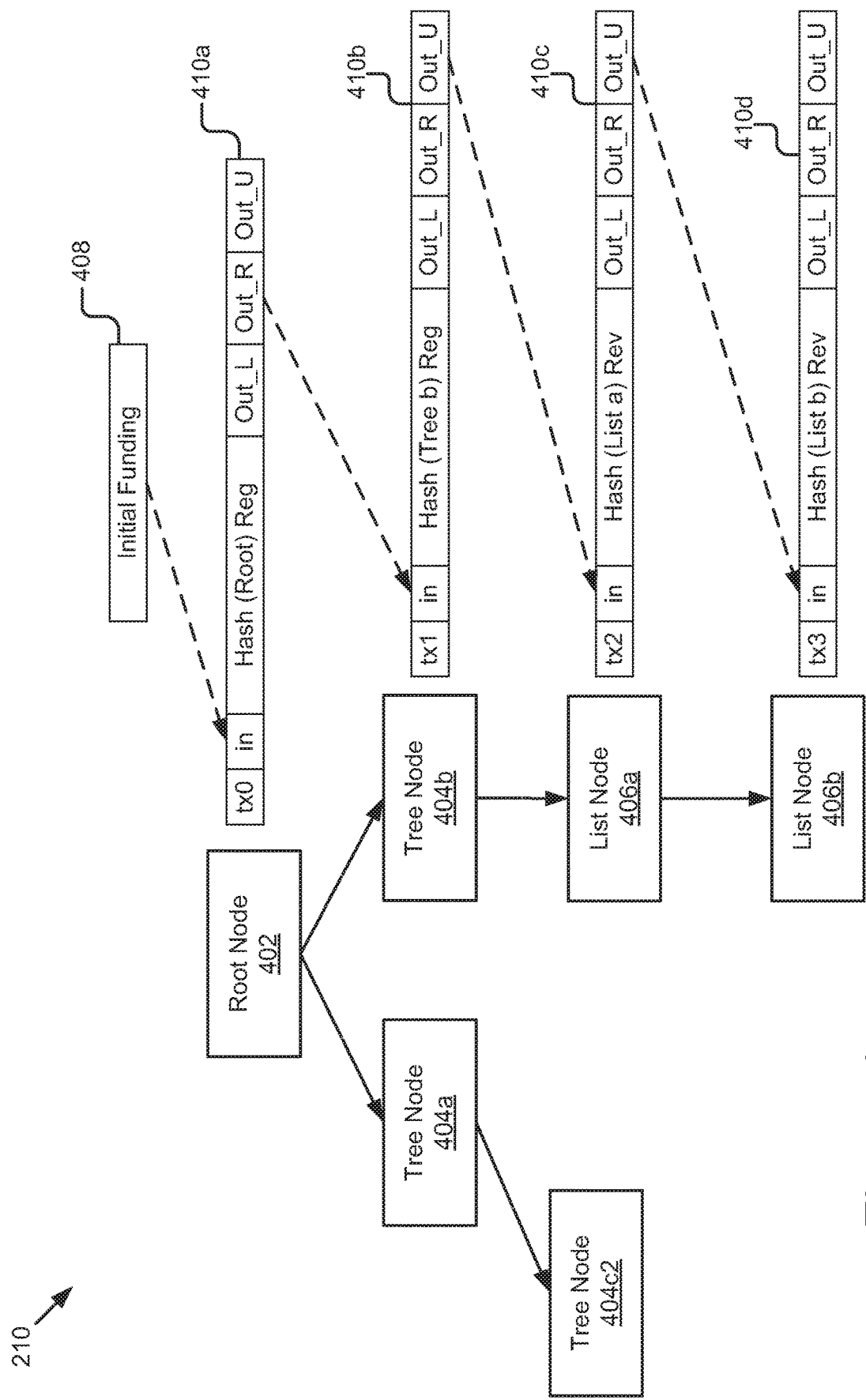
FIG. 4 is a block diagram of an index tree that can be used in conjunction with providing secure updates.

FIG. 4 is a block diagram of an example index tree 210 which can be used in conjunction with a system for providing secure updates. As shown in this example, the index tree 210 may include a plurality of nodes including a root node 402, one or more tree nodes 404, and one or more list nodes 406. The root node 402 may be the first node and may be linked by an initial funding 408 as the input of the root node 402. A registration of a software package may be referred to as a registration, and each tree node 404 represents a registration of a different software package. A revision to a previously registered software package may be stored as an update transaction in a list node 406.

The update engine 214 may maintain the index tree 210 by adding new tree nodes to represent different software applications. The update engine 214 may add a tree node to the index tree by spending an unspent transaction output ("UTXO") of a parent tree node as an input to the new node, as shown by the broken lines from the output of a transaction 410 to an input of a subsequent transaction, and linking the tree node 404b to the root node 402. The update engine 214 may add a tree node 406 by:

Spending an UTXO of a parent tree node.
Embedding a verifiable random hash of a software package name.
Embedding a secure hash of a registration.
Creating an UTXO for an update chain.
Creating one or more UTXOs for subtrees, such as in one implementation having two UTXOs for a left output and a right output of the index tree 210.

The UTXO may be a transaction output created for a particular recipient identified in a specific way, such as a Bitcoin address in the Bitcoin blockchain. The transaction output can be converted into a public key. In order for the UTXO to be spent, the recipient provides a cryptographic proof, such as a signature derived from the private key that is verifiable by the public key obtained from the specific way the recipient is identified, such as the Bitcoin address. It should be understood that a particular recipient may have multiple transaction outputs that link back to that particular recipient, and are represented as UTXOs until a transaction output is linked to a new recipient. Then the new recipient may then have new UTXOs that link back to the new recipient when spent.

In some implementations, the update engine 214 may embed a verifiable key in the node. The verifiable key may be associated with the software package, and may be used to verify that the software package has not been compromised at a later time. In some implementations, the verifiable key may be a verifiable random hash of the software package name. If the software package is later compromised and/or changed, a future random hash of the software package would not match with the verifiable random hash that has been embedded in the block 110. As shown in the index tree 210 in FIG. 4, the transactions 410, represented as tx0-tx3, each include a hash of the name of the node they are associated with. In some implementations, the update engine 214 may embed a secure hash of a registration in the transaction 410.

In some implementations, the update engine 214 may create a UTXO for an update chain of the registration. The update chain allows for a subsequent revision of the software application named in the registration to be linked to the tree node 404 of the software application, by spending the UTXO of the update output. As shown in the example, the list node 406a represents a revision to the software application associated with the tree node 404b. The list node 406a may be linked to the tree node 404b by spending the update UTXO in transaction 410b as the input in transaction 410c. Subsequent revisions to the registration may spend the update UTXO of the list node 406a, such as is shown by list node 406b in the example. The update chain allows for all revisions to a software registration to be linked under the same tree node 404 of the index tree 210.

In some implementations, the update engine 214 may create one or more UTXOs for subtrees of the index tree 210. For example, the update engine 214 may create a left UTXO and a right UTXO, and subsequent tree nodes 404 may spend the left UTXO or the right UTXO in a later registration to add a new registration represented by the tree node 404 in the index tree 210. In some implementations, the position of a tree node 404 in the index tree 210 may be determined by a hash value of the name to be inserted and the availability of a UTXO at the time of insertion. The hash value of the name may be randomly calculated by a verifiable random function, and the index tree 210 may sort the registrations based on whether the hash value of the name is greater or less than the hash value of a name stored in a specific tree node 404, thus allowing for the index tree 210 to sort the placement of new tree nodes 404 and randomly distribute the tree nodes 404 within the index tree 210.

In some implementations, when the transactions operate in a publicly accessible transaction log 108 that uses real world funds to create transactions (such as Bitcoin, etc.) the new transactions 410 represented as new nodes (either tree nodes 404 or list nodes 406) use additional funding to create the transaction outputs (e.g., update UTXOs and/or UTXOs for subtrees) and the update engine 214 can introduce additional funding at any time by adding more transaction inputs to a transaction. In further implementations, where the publicly accessible transaction log 108 uses alternate mechanisms for linking instead of real-world funds, such as account based linking used in Ethereum, etc., the update engine 214 can use the alternative linking mechanisms to operate on those publicly accessible transaction logs 108. The process is blockchain agnostic, allowing it to run on any publicly accessible distributed ledger with only minor changes to how the transactions 410 are linked.

In some implementations, the update engine 214 may add a list node 406 to the index tree by spending an unspent transaction update ("UTXO") of a tree node associated with the software package as an input to the new list node 406, as shown by the broken lines from the output Out_U of a transaction 410b to an input of a subsequent transaction 410c, and linking the list node 406a to the tree node 404b. The update engine 214 may add a list node 406 by:

Spending an UTXO of a parent tree node, which may be either a tree node 404 or a list node 406 that is associated with the software package registered in the tree node 404.

Embedding a secure hash of a revision associated with the software package registered in the tree node 404.

Creating an UTXO for a subsequent list node 406 to spend in the update chain.

In some implementations, the update engine 214 may look through the index tree 210 and identify an update chain associated with a specific software package by identifying the tree node 404 that registered the specific software package. All of the transactions 410 of the update output of that tree node 404 are then included in the update chain of that software package. When all transactions are combined, from the root node 402 and transaction 410a to the end of the update chain, those transactions form the transaction chain. In the example of the transaction chain for tree node 404b, the transaction chain includes transactions tx0, tx1, tx2, and tx3 represented as 410a-410d. A given transaction chain can be used to prove the integrity of a software package and the software packages updates.

Figure 5:
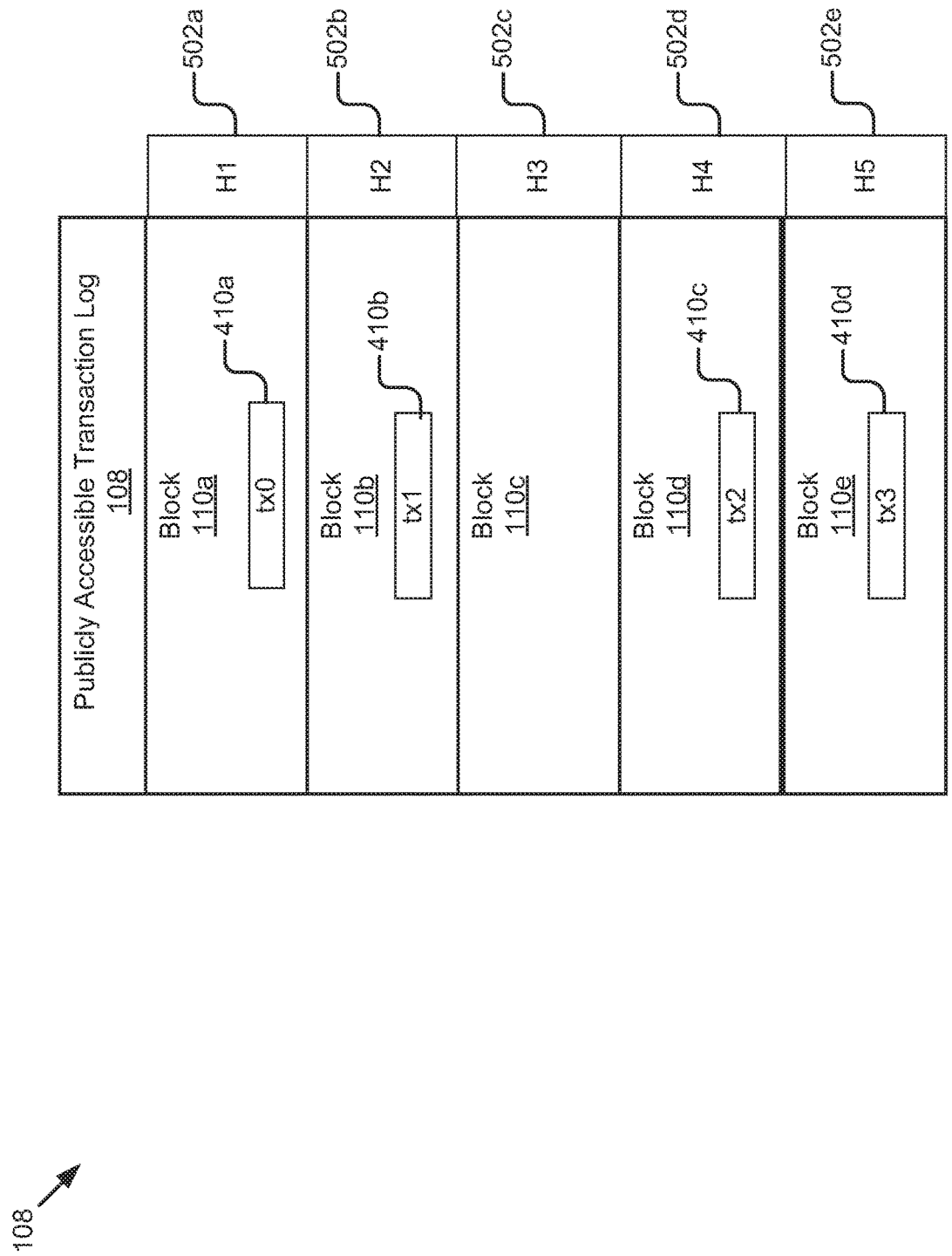
FIG. 5 is a block diagram of an example publicly accessible transaction log that can be used in conjunction with providing secure updates.

FIG. 5 is a block diagram of a publicly accessible transaction log 108 that can be used in conjunction with providing secure updates. In the example, one or more blocks 110 of the publicly accessible transaction log 108 may be used to store transactions 410. Each of the blocks 110 may include an identifier 502 that indicates a location of the block 110 in the publicly accessible transaction log 108. The identifier may be used by components of the system described in FIG. 1 to access the transaction 410 stored at the block 110. In some implementations, the identifier 502 may be a height of the block 110 in the publicly accessible transaction log 108. In some implementations, the identifier may be a transaction identifier that uniquely identifies a transaction within a block 110.

In some implementations, after a transaction 410 has been created, the update engine 214 broadcasts the transaction 410 to one or more blocks 110 of the publicly accessible transaction log 108 and the block 110 may store the transaction 410 at that block 110. The update engine 214 may then wait until at least one full-node block 110 of the publicly accessible transaction log 108 confirms that the transaction 410 has been included in the latest block 110. Once the update engine 214 has received confirmation that the transaction 410 has been included in the latest block 110 and/or that the broadcasted transaction 410 is safe, the update engine 214 may mark the node of the index tree 210 that includes the transaction 410 as secure and create an operation. In some implementations, an operation may be a record that includes both the transaction 410, and the identifier 502 of the block 110 that includes that transaction 410 in the publicly accessible transaction log 108.

In some implementations, for each node in the index tree 210, there is a corresponding operation that includes the transaction 410 and the identifier 502 of the block 110. In further implementations, the operation created by the update engine 214 may include:

Data: original, non-hashed developer submitted data.
Raw transaction: original transaction 410.
Transaction identifier: a unique hash generated from the transaction 410.
Anchor: the identifier 502 indicated the location of the block 110 where the transaction 410 is stored in the publicly accessible transaction log 108.

The end-point device 106 may use the operation to verify whether the software package has been compromised by reproducing the hash of the data, and comparing it with the proof found in the transaction 410 specified by the identifier 502 provided in the operation. In some implementations, the end-point device 106 may use the anchor to reduce bandwidth by using the identifier 502 to pinpoint the specific block 110.

Since the blocks 110 of the publicly accessible transaction log 108 may be publicly accessed and used to store various data, some of the blocks 110 may store transactions that are not from the update engine 214, such as block 110c in the example in FIG. 5. It should be understood that the identifier 502 of each block 110 may be used by a separate device, such as the end-point device 106, to separately access the transaction 410 stored in the block 110.

In some implementations, the update engine 214 may identify an operation log for a software package. In some implementations, the operation log of the software package may be an ordered list of operations required to verify the existence of the registration of the software package in the update server 104 and the authenticity of revisions registered to the software package. In some implementations, the operation log may include two parts, a proof of existence and the update chain.

In some implementations, the proof of existence of the software package registration includes a list of operations in the index tree 210 along a path that starts from the root node 402 and ends at the most recent node associated with the software package, such as list node 406b in the example in FIG. 4. The proof of existence allows an end-point device 106 to securely verify that the software registration does exist in the update server 104, and the end-point device 106 can verify the validity of a registration by reviewing transaction outputs presented in the proof of existence. Once the end-point device 106 has verified the proof of existence of the software package registration, then the end-point device 106 can verify the rest of the operations from the end of the operation log back until it reaches the registration using the update chain.

In some implementations, rather than downloading the entire operation log to the end-point device 106, the end-point device 106 can verify whether a transaction 410 indicated in an operation is also included in the corresponding block 110 represented by the identifier 502 provided by the operation. In some implementations, the end-point device 106 can easily verify the transaction 410 in the block 110 using the identifier 502. For example, in a Bitcoin blockchain, the existence of the transaction 410 can be verified using a Bitcoin Simple Payment Verification that enables a query of a Bitcoin full node to determine whether a transaction 410 exists in the specified block 110, and the Bitcoin full node can return a Merkle branch for the queried transaction. A Merkle branch is a sequence of hashes that are used to reconstruct the root of a Merkle tree of transaction identifiers presented in the block 110 header. Since the size of a Merkle branch is proportional to the logarithm of the number of transaction included in the block 110, the end-point device 106 can quickly calculate the root of a Merkle tree given a non-empty Merkle branch. The end-point device 106 can perform the query of the Merkle branch using the transaction identifier to indicate which transaction 410 to look for and the identifier 502 representing the block 110, such as a block height. In some implementations, if the update server 104 does not provide the transaction identifier, then the end-point device 106 can derive the transaction identifier using the digital information provided by the update server 104. It should be understood that the Merkle branch is merely one example for use in a Bitcoin blockchain, and other methods of accessing information in blocks in other publicly accessible transaction logs 108 are also contemplated.

In some implementations, once the update engine 214 confirms that the transactions 410 are in the claimed blocks 110, then the update engine 214 may check whether each transaction 410 has spent the correct output of a previous transaction 410 and a valid chain has been formed. By validating the cryptographic links, the update engine 214 can confirm that the transactions 410 are encoded by the update server 104 and the correct operation log can be provided to the end-point device 106 for verification of the software package.

In some implementations, the end-point device 106 may use the update verifier 310 to verify the integrity of revisions of a software package. In some implementations, the update verifier 310 may reproduce and compare verifiable keys, such as hashes of data, which are observed in operations provided by the update server 104, to verifiable keys, such as hashes of data stored in transactions 410 in the blocks 110 of the publicly accessible transaction log 108. By comparing the operations to the transactions 410, the update verifier 310 can prove that the operation log provided by the update engine 214 is the same data submitted by the developer who owns the registration. If the update verifier 310 determines that the hashes match, then the update verifier 310 can run the identity scripts presented in a revision and included in the operation logs to validate signatures.

In some implementations, the update verifier 310 may perform one or more of the following verification tasks as described elsewhere herein:
Verify that the transaction 410 is stored in the claimed block 110 represented by the identifier 502.
Verify that the transaction 410 has spent the correct output of a previous transaction 410.
Verify that the transaction 410 has the correct hash of the current operations revision.
Verify that the one or more signatures included in the operation satisfy the permissions threshold of a previous operations identity script.

In some implementations, if any of the above verification tasks fail, then the update verifier 310 can conclude that the operations are not valid and that the software package and/or the update server 104 have been compromised. In some implementations, the update verifier 310 may provide the determination of the verification tasks to the update installer 314, and the update installer may either retrieve the software update and begin installing the software update if the verification tasks were completed or perform a security action if one or more verification tasks failed.

In some implementations, the update server 104 may provide the digital information and the identifier 502 of the block 110 to the end-point device 106. As described above in the specific example, in some implementations, the update server 104 may provide the operation log that includes the digital information and the identifier 502. In some implementations, the update server 104 may provide the digital information and the identifier 502 using delivery modes such as poll-based delivery, publish/subscribe-based delivery, or push-based delivery. Using the push-based delivery, the update server 104 can send digital information, such as updates, to end-point devices directly using registered addresses of the end-point devices 106.

Using poll-based delivery, the end-point device 106 can regularly check with the update server 104 to determine whether new digital information, such as a new software package and/or revision, have been received by the update server 104. In some implementations, the end-point device 106 may reach out to the update server 104 on a schedule and in further implementations, the end-point device 106 may increase a time period between reaching out to the update server 104 when no digital information for the end-point device 106 has been received by the update server 104. Poll-based delivery provides fault tolerance since polling retries when a request fails. End-point devices 106 that use polling will eventually receive the digital information, such as a software update, even if the end-point device 106 is deployed on an unreliable network. The poll-based delivery can keep the end-point device 106 reasonably up-to-date while also distributing polling requests. The time period between polling requests can be changed based on the need for the digital information to be provided to the end-point device 106 balanced by the amount of bandwidth and overhead that increases as the period between requests is reduced.

Using the publish/subscribe-based delivery, the end-point device 106 subscribes to specific digital information, such as a given software update, and the update server 104 can provide notifications to the end-point device 106 when the specific digital information is received at the update server 104. The subscription of the end-point device 106 may be stored in an infrastructure, such as a list stored at the update server 104. The update server 104 triggers the notification when the event occurs, and the end-point device 106 can receive the digital information with a short latency from when the event occurred.

Figure 6:
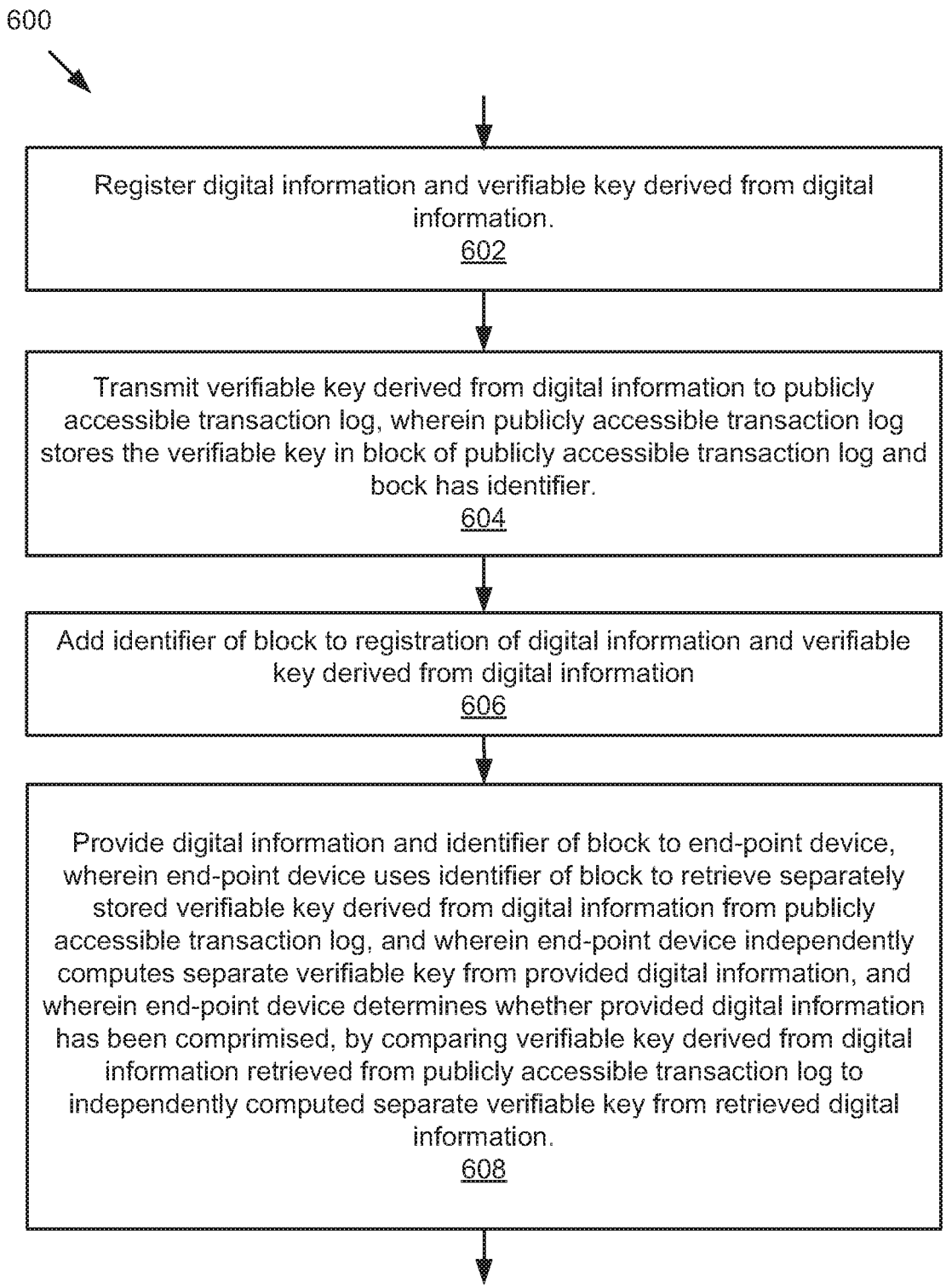
FIG. 6 is a flowchart of an example method for providing a secure update.

FIG. 6 is a flowchart 600 of an example method for providing a secure update. At 602, the update engine 214 can register digital information and a verifiable key derived from the digital information. In some implementations, the digital information includes a software update associated with software running on an end-point device 106. In some implementations, the digital information may be received from a remote computing device, such as the device 102 in FIG. 1. In some implementations, the update engine 214 may derive the verifiable key from the digital information, such as by calculating a hash of the digital information. In some implementations, the hash of the digital information may be received from the device 102, while in further implementations, the update engine 214 may derive the hash, such as a hash of a software package name, a hash of a registration, a hash of a revision, a hash of a transaction, etc.

At 604, the update engine 214 may cause the communication unit 206 to transmit the verifiable key derived from the digital information to a publicly accessible transaction log 108. In some implementations, the publicly accessible transaction log 108 may store the verifiable key in a block 110 of the publicly accessible transaction log 108. In some implementations, the block 110 of the publicly accessible transaction log 108 may have an identifier 502. In some implementations, the identifier 502 may be used to locate the block 110 at a later time. In some implementations, the identifier 502 may be a height of the block 110 in the publicly accessible transaction log 108. The height of the block 110 may be relative to a first block 110 in the publicly accessible transaction log or a reference block 110 in the publicly accessible transaction log. In some implementations, the publicly accessible transaction log 108 may provide the identifier 502 to the update server 104 for to store.

At 606, the update engine 214 may add the identifier 502 of the block 110 to a registration of the digital information and the verifiable key derived from the digital information. In some implementations, the update engine 214 may add the identifier 502 to a transaction 410 that includes the digital information and the verifiable key as described elsewhere herein. In further implementations, the update engine 214 may add the identifier 502 to an including the transaction 410 and the identifier 502.

At 608, the update engine provides the digital information and the identifier 502 of the block 110 to the end-point device 106. In some implementations, the update engine 214 provides the operation and/or an operation log that includes transactions 410 as described elsewhere herein. In some implementations, the update verifier 310 of the end-point device 106 uses the identifier 502 of the block 110 to retrieve the separately stored verifiable key derived from the digital information from the publicly accessible transaction log 108. In some implementations, the update verifier 310 may independently compute a separate verifiable key from the provided digital information, such as a hash of the transactions included in the digital information, etc. In some implementations, the update verifier 310 may determine whether the provided digital information has been compromised, such as by comparing the verifiable key derived from the digital information that was retrieved from the publicly accessible transaction log 108 to the independently computed separate verifiable key from the retrieved digital information. In some implementations, based on the determination of whether the provided digital information has been compromised, the update verifier 310 may signal the update installer 314 to either access and/or install the update indicated in the digital information or perform a security action, such as blocking installation of the update.

Figure 7:
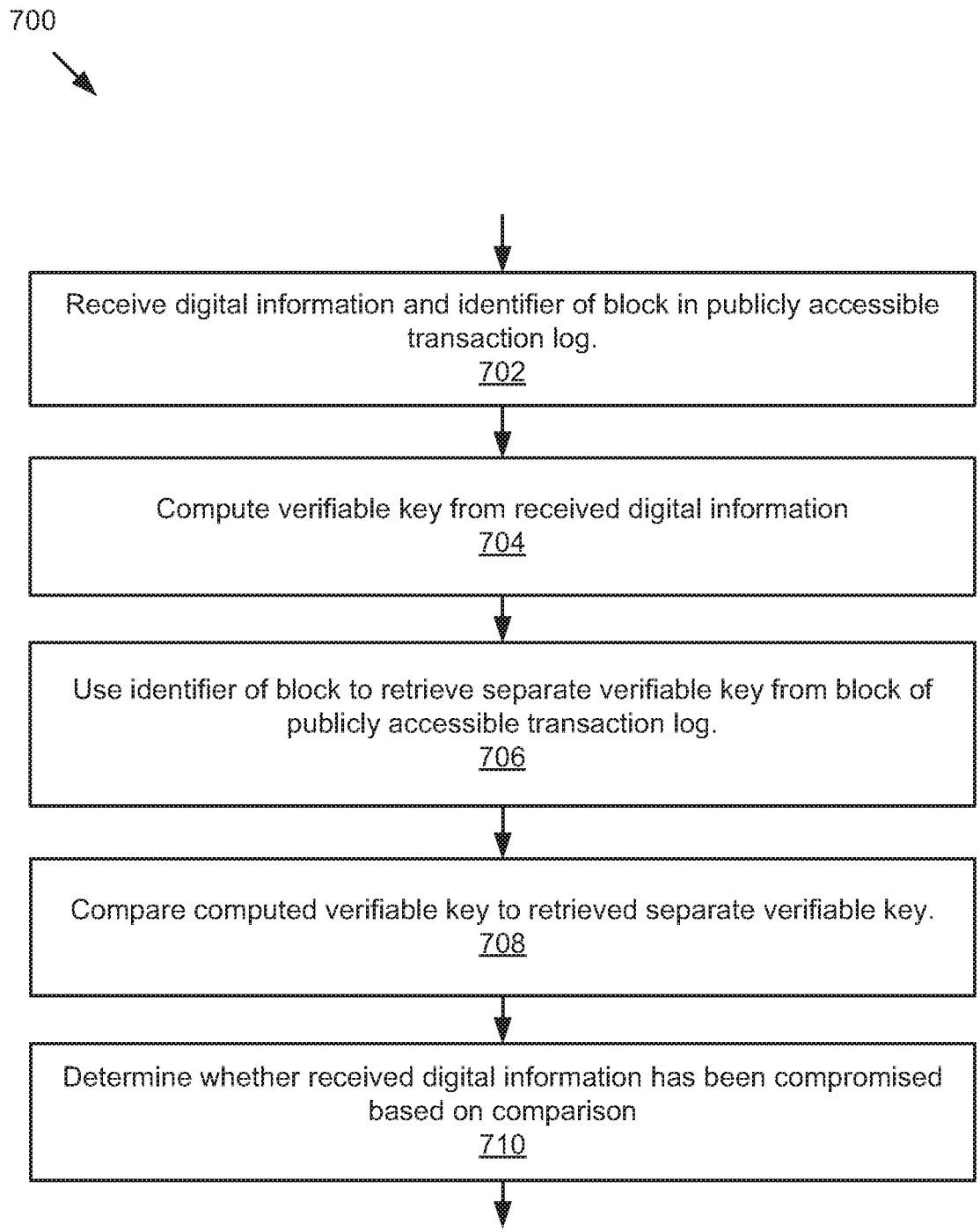
FIG. 7 is a flowchart of an example method for providing a secure update.

FIG. 7 is a flowchart 700 of an example method for providing a secure update. At 702, the update verifier 310 may receive the digital information and the identifier 502 of the block 110 in the publicly accessible transaction log 108. At 704, the update verifier 310 may compute a verifiable key from the received digital information. In some implementations, the verifiable key may be a hash of a transaction and/or a software name included in the digital information. At 706, the update verifier 310 may use the identifier 502 of the block 110 to retrieve a separately verifiable key from the block 110 of the publicly accessible transaction log 108. In some implementations, the separately verifiable key may have been previously stored in the block 110 of the publicly accessible transaction log by the update server 104. At 708, the update verifier 310 may compare the computed verifiable key to the retrieved separately verifiable key. At 710, the update verifier 310 may determine whether the received digital information has been compromised based on the comparison.

In some implementations, the system described above may operate as a secure naming system that receives digital information representing one or more names from device 102. An end-point device 106 may validate name bindings associated with the one or more names using information stored in blocks 110 of the publicly accessible transaction log 108. The update server 104 may function as a namepsace administrator that administers namespaces using the one or more names.

In some implementations, the namespace is maintained by the namespace administrator that provides an abstraction of a public, unforgeable mapping from a name to a corresponding operation log representing an append-only history of name bindings represented as values bound to that name. In some implementations, the operation log may comprise a transaction in a block 110 of the publicly accessible transaction log 108, such as a Bitcoin blockchain, mapping indices that represent nodes of the index tree, and/or numerical keys derived by hashing the one or more names, such as for example a 256-bit cryptographic hash.

Similar to what is described with respect to FIG. 4, the namespace administrator maintains an index tree and each node of the index tree may include a return output storing an index-hash pair comprising an index and a 256-bit hash. The namespace administrator can insert a new index-hash pair to the tree by broadcasting the new node to the publicly accessible transaction log 108, spending the output that would connect the new node to the index tree 210 in such a way that searching for the index would find the new node. In some implementations, the namespace administrator may maintain control over the insertion of new nodes to the index tree 210 by sending the spendable outputs (such as the Out_L, Out_R, and/or Out_U in FIG. 4) to an address in the publicly accessible transaction log 108 that includes a private key known only to the namespace administrator.

In some implementations, for a node in the index tree 210, the namespace administrator can generate a proof of existence that an index of a specific node is bound to a particular 256-bit hash. In some implementations, the proof of existence includes publicly accessible transaction log 108 transactions that form a path traced by applying a standard binary search tree search algorithm for the index of the specific node. The path leads from a root transaction to a transaction that includes the index of the specific node. In some implementations, the proof of existence further includes evidence that each transaction of the path exist in the publicly accessible transaction log 210. In some implementations, the evidence may be a Merkle tree branch to a hash of a specific block 110, as described elsewhere herein.

In some implementations, an end-point device 106 can validate the proof of existence for the index of the specific node. In some implementations, the end-point device 106 receives hardcoded information related to the root transaction of a path and can use the root transaction and the index of the specific node to identify indices of the other nodes in the path. The end-point device 106 checks the following properties of the path to validate the proof of existence:

The evidence that each transaction of the path exists in the publicly accessible transaction log 108 are correct.

The first transaction in the proof of existence is the same of the root transaction received by the end-point device 106.

One of the outputs of the node represented by the last transaction in the path binds a hash to the index of the specific node. For example, if the node has four outputs, Out_L, Out_R, Out_U, and Return, the return output is used.

Each transaction in the proof of existence spends expected outputs of previous transactions. For example, in a binary search tree, if the index of the specific node is less than an index of a previous node, then the specific node spends a first output of the previous node and if the index of the specific node greater than an index of the previous node, then the specific node spends a second output of the previous node.

In some implementations, as described elsewhere herein, the index tree 210 may include an update chain. The namespace administrator can append more entries to an operation log by appending update nodes (similar to how the list node 406 is appended to a tree node 404). In some implementations, the namespace administrator may append an update node to the index tree 210 responsive to a name-binding being updated and/or changed. Since the publicly accessible transaction log 108 does not allow for information to be rolled back or overwritten, the update chain can be used to capture a subsequent name-binding change and the last entry of an update change reflects the most current version of the name-binding known to the namespace administrator.

In some implementations, an end-point device 106 can query the namespace administrator for a name and the namespace administrator can provide a verifiable random function associated with the queried name, a proof of existence associated with the queried name, and/or an operation log associated with the queried name.

In some implementations, the verifiable random function is a random function that requires a private key that is known to the namespace administrator to compute. The verifiable random function can be publicly verified by the end-point device 106 after the namespace administrator has computed it. In some implementations, the end-point device 106 can derive the index of the specific node associated with the query of the name using the verifiable random function. In some implementations, as described above, the end-point device 106 can then verify the proof of existence for the operation log associated with the derived index. In some implementations, the end-point device 106 may then verify the operation log associated with the derived index by determining whether the operation log hashes to the values matching in the proof of existence.

In some implementations, the operation log may comprise one or more operations and each operation may be signed by a cryptographic identity declared in a previous operation. In some implementations, the operations may include:

A random nonce that randomizes the hash of each operation. In some implementations, the random nonce may be used to detect replay attacks, where the namespace administrator replaces previous bindings in cases where a previous binding has a signature from the latest owner.

An identity script representing a cryptographic identity authorized to generate the next operation bound to the name (e.g., a current owner).

A collection of cryptographic signatures, valid with respect to the identity script declared in the previous operation. As described elsewhere herein, the signatures may be used to determine whether a permissions threshold for an operation has been met.

Data associated with the name.

As will be understood by those familiar with the art, the subject matter described herein may be embodied in other specific forms without departing from the spirit or essential characteristics thereof. Likewise, the particular naming and division of the protocols, portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

It is to be understood that although the update server 104 is at times referred to herein as a single entity, the update server 104 represents a collection of functionalities, which can be instantiated as multiple (or a single) module(s) as desired. It is to be understood that modules comprising an instantiation of the update server 104 could be in the form of object code or executable images within the system memory (e.g., RAM, ROM, flash memory) of any computer system(s), such that when one or more processors of the computer system(s) processes a module, the computer system(s) execute(s) the associated functionality. As used herein, the terms "computer system," "computer," "client," "client computer," "server," "server computer" and "computing device" mean one or more computers configured and/or programmed to execute the described functionality. Additionally, program code to implement the described functionalities can be stored on computer-readable storage media. Any form of tangible computer readable storage medium can be used in this context, such as magnetic or optical storage media. As used herein, the term "computer readable storage medium" does not mean an electrical signal separate from an underlying physical medium. In addition, some or all of the functionality described herein can be implemented in hardware and/or firmware, instead of and/or in combination with software based instantiations thereof.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

Furthermore, the modules, routines, features, attributes, methodologies and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in other ways. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method of providing a secure update from a server to an end-point device comprising:
    registering, by a server, initial digital information and a verifiable key derived from the initial digital information by inserting an initial specific node in an index tree containing the initial digital information and the verifiable key derived from the initial digital information, the initial digital information originating from a first source, the initial specific node of the index tree spending an unspent transaction output from a previous node of the index tree;
    registering, by the server, subsequent digital information unrelated to the initial digital information contained in the first specific node by inserting a second specific node in the index tree containing the subsequent digital information and a subsequent verifiable key derived from the subsequent digital information, the subsequent digital information originating from a second source, the second specific node of the index tree spending an unspent transaction output from a previous node of the index tree;
    instantiating the second specific node as a child of the first specific node in the index tree;
    wherein each node of the index tree represents a registration of a different, separate unit of digital information and a different, separate verifiable key derived therefrom, each separate unit of digital information originating from a separate source, the index tree providing secure access of specific digital information originating from a specific source by the end-point device, wherein the endpoint devices trusts the specific source while avoiding trusting the server;
    transmitting, by the server, the verifiable key derived from the initial digital information and the verifiable key derived from the subsequent digital information to a publicly accessible transaction log, wherein the publicly accessible transaction log separately stores the verifiable key derived from the initial digital information in a block of the publicly accessible transaction log, and the verifiable key derived from the subsequent digital information in a separate block of the publicly accessible transaction log, wherein each block has a separate identifier;
    adding, by the server, the identifier of each separate block to the respective registration of the corresponding digital information and the verifiable key derived from the digital information; and
    providing, by the server, the digital information and the identifier of a specific block to the end-point device, wherein the end-point device uses the identifier of the specific block to retrieve the separately stored verifiable key derived from the digital information from the publicly accessible transaction log, and wherein the end-point device independently computes a separate verifiable key from the provided digital information, and wherein the end-point device determines whether the provided digital information has been compromised, by comparing the verifiable key derived from the digital information retrieved from the publicly accessible transaction log to the independently computed separate verifiable key from the retrieved digital information;
    wherein the index tree ensures that every end-point device using a specific identifier to retrieve a specific block receives identical, specific corresponding digital information from a specific corresponding source.

2. The method of claim 1, wherein the end-point device is an internet of things ("IoT") device.

3. The method of claim 2, wherein the IoT device is one from a group consisting of: a smart thermostat, a smart vehicle, a smart speaker, a smart appliance, a smart security system, a wearable device, a smart camera, a smart entertainment system, a smart lock, and a smart lighting device.

4. The method of claim 1, wherein the publicly accessible transaction log is a blockchain.

5. The method of claim 4, wherein the blockchain is Bitcoin.

6. The method of claim 4, wherein the blockchain is Ethereum.

7. The method of claim 1, wherein the identifier of the block is a height of the block in the publicly accessible transaction log, the height of the block being relative to a reference block in the publicly accessible transaction log.

8. The method of claim 1, wherein:
    digital information further comprises a software update, and an originating source further comprises a software publisher.

9. The method of claim 1, further comprising:
    receiving digital information from a remote computing device and wherein digital information comprises a registered public key.

10. The method of claim 1, wherein the verifiable key derived from the digital information comprises a hash of the digital information, wherein the hash of the digital information is received by the server from a remote computing device.

11. The method of claim 1, wherein the verifiable key derived from the digital information comprises a cryptographic hash of the digital information, wherein the hash of the digital information is computed by the server.

12. The method of claim 1, wherein the end-point device determines that the provided digital information has been compromised, responsive to the verifiable key derived from the digital information retrieved from the publicly accessible transaction log not matching the independently computed separate verifiable key from the retrieved digital information, and wherein the end-point device takes a security action in response to the determination that the digital information has been compromised.

13. The method of claim 1, wherein the end-point device determines that the provided digital information has not been compromised, responsive to the verifiable key derived from the digital information retrieved from the publicly accessible transaction log matching the independently computed separate verifiable key from the retrieved digital information, and wherein the end-point device utilizes the digital information in response to the determination that the digital information has not been compromised.

14. The method of claim 13, wherein the provided digital information comprises a software update for the end-point device and wherein utilizing the digital information comprises installing the software update on the end-point device.

15. The method of claim 1, further comprising:
   receiving a signature associated with the digital information, the signature being verifiable with a registered public key associated with the digital information;
   determining from the digital information, a permissions threshold associated with the digital information, the permissions threshold representing a quantity of signatures; and
   determining that the received signature satisfies the permissions threshold.

16. The method of claim 1, further comprising:
   referencing the second specific node by an update reference of the first specific node in an update chain.

17. The method of claim 1, wherein the index tree is a binary search tree.

18. A method of providing a secure update from a server to an end-point device comprising:
   receiving, by a server, a first software package from a first remote computing device;
   encoding the first software package as a first transaction in a first node of an index tree, the first node of the index tree spending an unspent transaction output from a previous node of the index tree;
   receiving, by a server, a second software package from a second remote computing device;
   encoding the second software package as a second transaction in a second node of an index tree, the second node of the index tree spending an unspent transaction output from a previous node of the index tree;
   wherein each node of the index tree represents a registration of a different, separate software package, each separate software packages originating from a separate remote computing devices, the index tree providing secure access of a specific software package originating from a specific remote computing device by the end-point device, wherein the endpoint devices trusts the specific originating remote computing device while avoiding trusting the server;
   broadcasting the first transaction encoding the first software package and the second transaction encoding the second software package to a publicly accessible blockchain, wherein the publicly accessible blockchain separately stores the first transaction and the second transaction in separate blocks each identified by a separate height in the publicly accessible block chain;
   receiving at the server, a height identifying a specific block in the publicly accessible blockchain;
   updating a corresponding transaction stored in a corresponding node of the index tree to include the height identifying the specific block in the publicly accessible blockchain; and
   providing the corresponding transaction to the end-point device, wherein the end-point device uses the height identifying the block in the publicly accessible blockchain to retrieve the separately stored transaction, and wherein the end-point device derives a hash of the software package included within the provided transaction, and wherein the end-point device determines whether a corresponding software package has been compromised by comparing the hash derived from the corresponding software package to a separate hash included as part of the separately stored transaction retrieved from the publicly accessible blockchain.

19. The method of claim 18, wherein the end-point device determines that the corresponding software package has not been compromised, responsive to the hash derived from the corresponding software package matching the separate hash included as part of the separately stored transaction retrieved from the publicly accessible blockchain, and wherein the end-point device installs the corresponding software package in response to the determination that the software package has not been compromised.

* * * * *